July 21, 1925.

A. C. DE LORME

WINDSHIELD CLEANER

Filed June 11, 1923

1,546,970

INVENTOR
ALFRED C. DE LORME
BY
A. D. T. Libby
ATTORNEY

Patented July 21, 1925.

1,546,970

UNITED STATES PATENT OFFICE.

ALFRED C. DE LORME, OF NEWARK, NEW JERSEY, ASSIGNOR TO TIFFANY MANUFACTURING COMPANY, OF NEWARK, NEW JERSEY.

WINDSHIELD CLEANER.

Application filed June 11, 1923. Serial No. 644,653.

*To all whom it may concern:*

Be it known that I, ALFRED C. DE LORME, a citizen of the United States, residing at Newark, in the county of Essex, State of New Jersey, have invented certain new and useful Improvements in Windshield Cleaners, of which the following is a description, reference being had to the accompanying drawing, and to the figures of reference marked thereon.

This invention relates to a cleaner particularly adapted for use on windshields such as are used on automotive vehicles.

One of the objects of my invention is to provide a windshield cleaner that will clean both sides of the glass substantially all the way across and one which can be readily moved lengthwise of the glass to any desired position.

Another object of my invention is to provide a wiper or cleaner which is relatively narrow in order not to obstruct the vision of the operator of the vehicle any more than possible.

Another object of my invention is to provide a cleaner so constructed as to protect the wiper strips as will be hereinafter set forth.

Other and further objects will be apparent after a study of the specification and drawing attached, wherein:

Figure 4 is a section on the line 4/4 of Fig. 2; while

Figure 1:
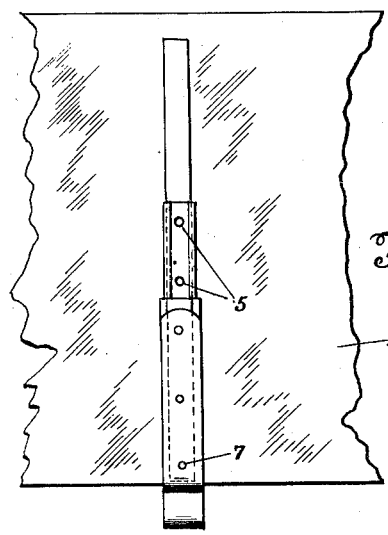
Figure 1 is a plan view on a reduced scale showing the cleaner in position on a portion of the windshield.
Figure 2:
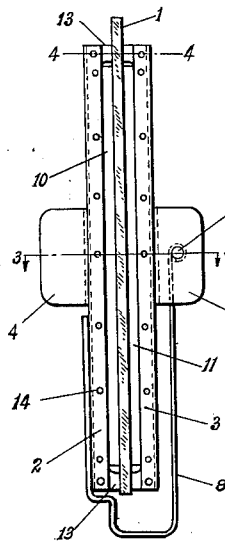
Figure 2 is a side view of Fig. 1.
Figure 3:
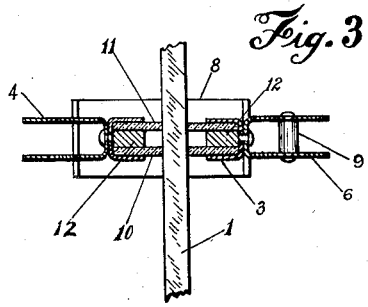
Figure 3 is a section on the line 3/3 of Fig. 2.
Figure 4:
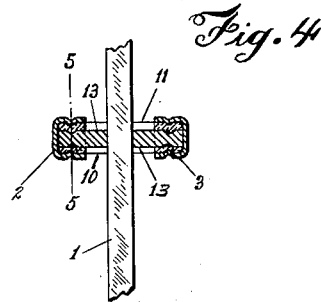
Figure 5:
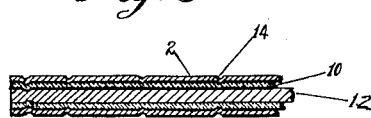
Figure 5 is a partial section on the line 5/5 of Fig. 4.

Referring now to the details wherein like numbers refer to corresponding parts in the various views, 1 is a fragmentary portion of a glass windshield on which is shown mounted my improved cleaner, which consists of channel members 2 and 3 that are substantially identical in construction. The channel member 2 has an ear 4 fastened thereto in any suitable manner, such as by rivets 5; while the member 3 has an ear 6 fastened thereto in a similar manner as the ear 4 to the member 2. The ear 4 is utilized as a handle to move the wiper over the surface of the windshield. Fastened to the member 2, in any suitable manner, as by rivets 7, is a resilient member 8, the open end thereof being formed around a stud 9 carried by the ear 6. Each of the channel members 2 and 3 contain two flexible wiper strips 10 and 11 preferably of soft rubber. These wiper strips are separated by a spacer 12. The spacer 12 has projections 13 at each end, which in the two members 2 and 3 project toward each other as clearly shown in Fig. 2. The object of these projections 13 is to prevent undue pressure on the wiper strips by the resilient member 8. As will be seen from Fig. 2 the projections 13 approach each other until they rest against the glass, thereby removing undue pressure on the wiper strips, which pressure in time would bend over the wiper strips and break them off. By having this regulation or control over the wiper strips, their life is materially increased and better action is obtained on the surface to be cleaned. The spacer itself may be of metal, as well as the projections 13. In fact I have found that an integral piece of soft aluminum gives a cheap and very satisfactory construction, as the soft metal will not scrape the glass and the projections being thus made out of metal will not deteriorate with use.

I preferably make all the parts, except the spring member 8 out of aluminum, thereby obtaining a cleaner which is very light and one which is substantially rust-proof, it being understood that the spring 8, being made of steel, is treated in a suitable manner to prevent rusting. The spacing members 12 at the ends where the projections 13 protrude are preferably countersunk so that the sides of the channel members 2 and 3, together with the rubber may be forced into the countersunk parts, by a suitable indenting operation. Of course rivets may be used, but I prefer the construction just described. I have found that intermediate the ends, that the wiper strips may be securely held in position by merely indenting the sides of the members 2 and 3 along their length as indicated at 14.

From the above description it will be seen that I have produced a wiper which has a few number of interchangeable parts, thereby producing a light and cheap, but efficient article, and it will be understood that certain changes may be made in the detailed construction, without departing from the spirit of my invention and the scope of the appended claims. For example, while the spring 8 is shown adapted to pass through a slot in a sectional windshield, the spring may be formed at the bottom so as to fit over the top rail of the windshield; furthermore, while I have shown a wiper element adapted to engage both sides of the glass of the windshield, it will be understood that only one of the wiper elements need be used in any satisfactory mounting arrangement.

Having thus described my invention, what I claim is:

1. In a windshield cleaner, a wiper element consisting of; an integral channel shaped member having a pair of flexible wipers positioned within the channel, a spacing member between said wipers and providing an open space therebetween, said spacing member having projections at each extremity extending to a point near the outer edges of said flexible wipers for the purpose described; means fastening the wipers and spacing member to the channel member, means for holding the wiper element positioned against the windshield and means for actuating the wiper element.

2. In a windshield cleaner, a pair of wiper elements each consisting of; a channel shaped member having a pair of flexible wipers positioned within the channel and a spacing member between said wipers providing an open space therebetween, means fastening the wiper and spacing member to said channel member, a resilient member rigidly fastened at one end to one channel member and pivotally fastened at the other end to the other channel member and a handle member attached to the inner of said wiper elements.

3. In a windshield cleaner, a pair of wiper elements each consisting of; a channel shaped member having a pair of flexible wipers positioned within the channel and a spacing member materially narrower than the width of said wipers and positioned within the channel and between said wipers with means for fastening the wiper and spacing member to said channel members, said spacing members having integral projections extending toward each other and into contact with the windshield for determining the pressure applied to said flexible wiper, a resilient member rigidly fastened at one end to one channel member and pivotally fastened at the other end to the other channel member and a handle member attached to the inner of said wiper elements.

4. In a windshield cleaner, a pair of wiper elements each consisting of; a channel shaped member having a pair of flexible wipers positioned within the channel and a spacing member between said wipers with means for fastening the wiper and spacing member to said channel members, a pair of ears attached one to each channel member, a resilient member fastened at one end to one channel member below its ear and having its other end attached to a pin carried by the ear on the other channel member, said first mentioned ear serving as a handle for operating the cleaner.

In testimony whereof, I affix my signature.

ALFRED C. DE LORME.